United States Patent
Zhu et al.

(10) Patent No.: US 12,512,482 B2
(45) Date of Patent: Dec. 30, 2025

(54) METAL FOAM GAS DIFFUSION LAYERS WITH HYDROPHILIC SURFACES AND POLYMER-ELECTROLYTE-MEMBRANE FUEL CELLS WITH METAL FOAM GAS DIFFUSION LAYERS

(71) Applicant: Toyota Motor Engineering & Manufacturing North America, Inc., Plano, TX (US)

(72) Inventors: Gaohua Zhu, Ann Arbor, MI (US); Shailesh N. Joshi, Ann Arbor, MI (US)

(73) Assignees: Toyota Motor Engineering & Manufacturing North America, Inc., Plano, TX (US); Toyota Jidosha Kabushiki Kaisha, Toyota (JP)

( * ) Notice: Subject to any disclaimer, the term of this patent is extended or adjusted under 35 U.S.C. 154(b) by 141 days.

(21) Appl. No.: 18/470,661

(22) Filed: Sep. 20, 2023

(65) Prior Publication Data

US 2025/0096282 A1    Mar. 20, 2025

(51) Int. Cl.
    *H01M 4/88* (2006.01)
    *H01M 4/86* (2006.01)
    (Continued)

(52) U.S. Cl.
    CPC ....... *H01M 4/8807* (2013.01); *H01M 4/8605* (2013.01); *H01M 8/1018* (2013.01);
    (Continued)

(58) Field of Classification Search
    CPC .................................................. H01M 4/8807
    See application file for complete search history.

(56) References Cited

U.S. PATENT DOCUMENTS

2010/0330448 A1*  12/2010  Perry ............... H01M 8/04753
                                                429/434
2017/0373329 A1*  12/2017  Minamiura ......... H01M 8/0247
(Continued)

FOREIGN PATENT DOCUMENTS

EP     3677696 A1  *  7/2020  .......... H01M 8/0245
JP     2011111644 A    6/2011
JP     2022145670 A *  10/2022

OTHER PUBLICATIONS

Sun et al., "Investigation of metal foam porosity and wettability on fuel cell water management by Electrochemical Impedance Spectroscopy," International Journal of Green Energy, 2021, pp. 708-719.

(Continued)

*Primary Examiner* — Brian R Ohara
(74) *Attorney, Agent, or Firm* — Christopher G. Darrow; DARROW MUSTAFA PC

(57) ABSTRACT

A bipolar plate-gas diffusion layer (GDL) assembly for a polymer-electrolyte-membrane (PEM) fuel cell includes a flat metallic bipolar plate and a porous metal GDL with superhydrophilic surfaces adjacent to and in direct contact with the flat metallic bipolar plate. The porous metal GDL includes flow channels defined by flow channels walls with flow channel surfaces. The flow channel walls and flow channel surfaces have an average porosity generally equal to an average porosity of an interior of the porous metal GDL and the superhydrophilic surfaces provide enhanced water removal from the PEM fuel cell.

20 Claims, 5 Drawing Sheets

(51) Int. Cl.
*H01M 8/10* (2016.01)
*H01M 8/1018* (2016.01)

(52) U.S. Cl.
CPC ............... *H01M 2004/8694* (2013.01); *H01M 2008/1095* (2013.01)

(56) References Cited

U.S. PATENT DOCUMENTS

2020/0119380 A1* 4/2020 Noda ................... H01M 8/124
2021/0242472 A1* 8/2021 Yanai ................. H01M 8/0243

OTHER PUBLICATIONS

Moze et al., "Hydrophilic and Hydrophobic Nanostructured Copper Surfaces for Efficient Pool Boiling Heat Transfer with Water, Water/Butanol Mixtures and Novec 649," Nanomaterials 2021, pp. 1-24.

Lee et al., "Alternative architectures and materials for PEMFC gas diffusion layers: A review and outlook," Renewable and Sustainable Energy Reviews, vol. 166, 2022, pp. 1-33.

* cited by examiner

METAL FOAM GAS DIFFUSION LAYERS WITH HYDROPHILIC SURFACES AND POLYMER-ELECTROLYTE-MEMBRANE FUEL CELLS WITH METAL FOAM GAS DIFFUSION LAYERS

TECHNICAL FIELD

The present disclosure generally relates to fuel cells, and particularly to gas diffusion layers for fuel cells.

BACKGROUND

Bipolar plates in polymer-electrolyte membrane (PEM) fuel cells separate and distribute reactant gases to an anode side and a cathode side of a membrane electrode assembly such that hydrogen is supplied to the anode side and oxygen is supplied to the cathode side. Bipolar plates also function to remove unreacted hydrogen from the anode side of the fuel cell and unreacted oxygen plus water from the cathode side. However, the presence of water on the cathode side can block oxygen transport to the membrane electrode assembly and thereby result in inhomogeneous and discontinuous distribution of reactants over the active cathode catalyst layer. Accordingly, water management in a PEM fuel cell is an important issue.

The present disclosure addresses the issue of water management in PEM fuel cells, and other issues related to PEM fuel cells.

SUMMARY

In one form of the present disclosure, a bipolar plate-gas diffusion layer (GDL) assembly for a polymer-electrolyte-membrane fuel cell includes a flat metallic bipolar plate and a porous metal GDL adjacent to and in direct contact with the flat metallic bipolar plate. The porous metal GDL includes superhydrophilic surfaces and flow channels defined by flow channel walls and flow channel surfaces. Also, the flow channel walls and the flow channel surfaces have an average porosity generally equal to an average porosity of an interior of the porous metal GDL.

In another form of the present disclosure, a polymer-electrolyte-membrane fuel cell includes an anode, a membrane electrode assembly with a membrane, an anode catalyst layer, and a cathode catalyst layer, a porous metal GDL with superhydrophilic surfaces, an average porosity, and flow channels defined by flow channel walls and flow channel surfaces, and a flat bipolar plate adjacent to and in direct contact with the porous metal GDL. Also, the flow channel walls and the flow channel surfaces have an average porosity generally equal to the average porosity of the porous metal GDL.

These and other features of the nearly solvent-free combined salt electrolyte and its preparation will become apparent from the following detailed description when read in conjunction with the figures and examples, which are exemplary, not limiting.

BRIEF DESCRIPTION OF THE DRAWINGS

The present teachings will become more fully understood from the detailed description and the accompanying drawings, wherein.

It should be noted that the figures set forth herein is intended to exemplify the general characteristics of the methods, algorithms, and devices among those of the present technology, for the purpose of the description of certain aspects. The figure may not precisely reflect the characteristics of any given aspect and are not necessarily intended to define or limit specific forms or variations within the scope of this technology.

DETAILED DESCRIPTION

The present disclosure provides a porous metal GDL and/or a PEM fuel cell with one or more porous metal GDLs. The porous metal GDL includes flow channels defined by flow channel walls with flow channel surfaces, and the flow channels are formed in a porous metal layer using a process such that an average porosity of the flow channel walls and flow channel wall surfaces is generally the same as an average porosity of an interior of the porous metal layer. Stated differently, and in contrast to cold pressing a porous metal layer to form flow channels therein, forming of the flow channels in the porous metal layer according to the teachings of the present disclosure does not compress the porous metal layer, does not result in a reduction of the porosity in the porous metal layer, and thereby provides a porous metal GDL for a PEM fuel cell with enhanced water management. In addition, in some variations at least a portion of the surfaces of the porous metal layer are superhydrophilic. And in such variations, the superhydrophilic surfaces can promote film-wise condensation of water during operation of the PEM fuel cell and the film-wise condensation allows for capillary driven water flow.

Figure 1:
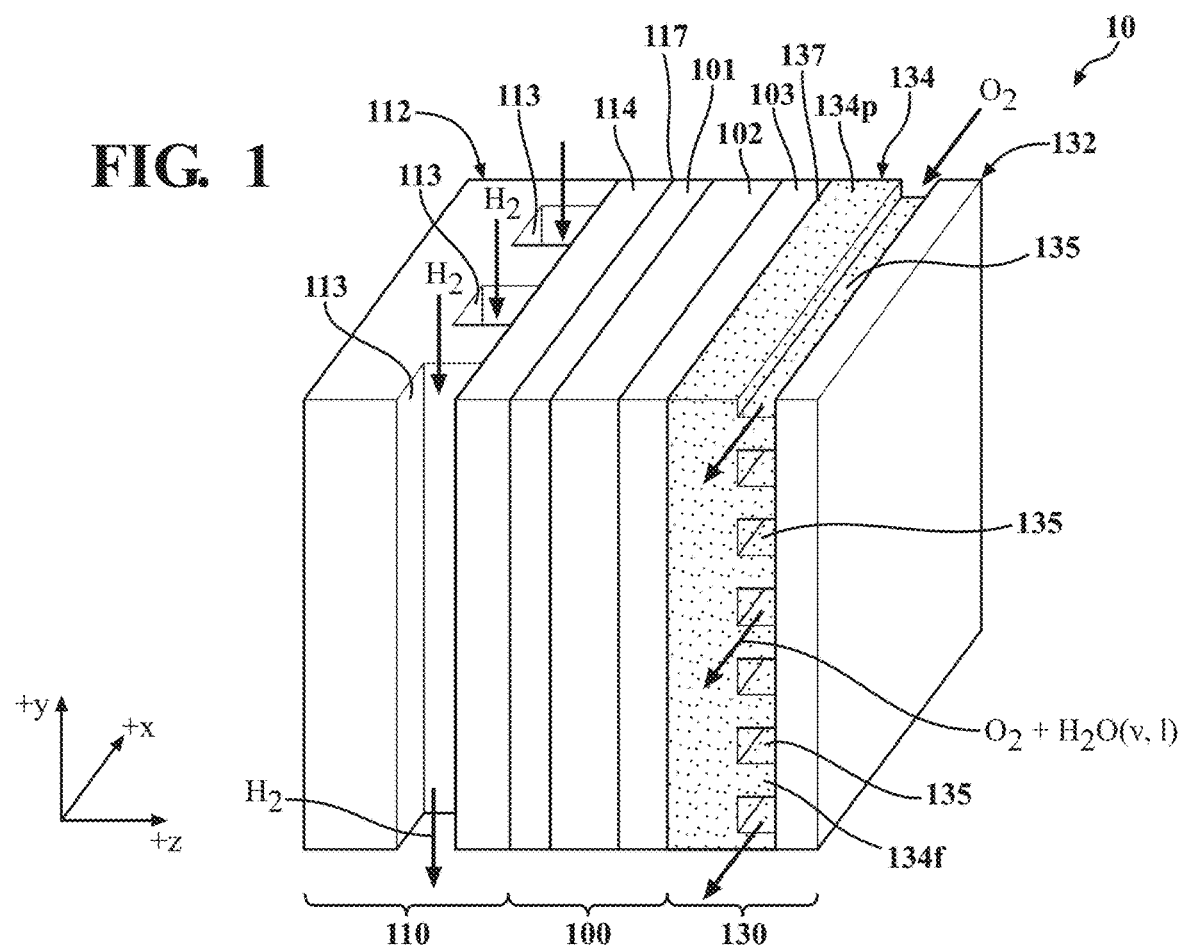
FIG. 1 illustrates a PEM fuel cell with a porous metal gas diffusion layer (GDL) according to one form of the present disclosure.

Referring now to FIG. 1, a PEM fuel cell 10 with a porous metal GDL according to one form of the present disclosure are shown. The PEM fuel cell 10 includes a membrane electrode assembly (MEA) 100, an anode side fluid flow system 110, and a cathode side fluid flow system 130. The MEA 100 includes a polymer-electrolyte membrane 102 sandwiched between an anode 101 and a cathode 103. In some variations, the MEA 100 layer includes an anode catalyst layer (not shown) and/or a cathode catalyst layer (not shown). The anode side fluid flow system 110 includes a conventional bipolar plate 112 with flow channels 113 and a conventional GDL 114. In some variations, the anode side fluid flow system 110 includes a microporous layer 117 between the anode 101 and the convention GDL 114.

The cathode side fluid flow system 130 includes a flat bipolar plate 132 and a porous metal GDL 134 with a planar section 134p, a flow channel section 134f, and flow channels 135 within the flow channel section 134f. In some variations, the cathode side fluid flow system 130 includes a microporous layer 137 between the cathode 103 and the porous metal GDL 134. And in at least one variation, the flow channels 135 are hollow flow channels, i.e., the flow channels 135 are not filled or occupied by a filler material and/or an adhesive. In addition, in some variations the flow channels are spaced apart from the cathode 103 and are positioned proximally to the flat bipolar plate 132 as illustrated in FIG. 1.

Figure 2A:
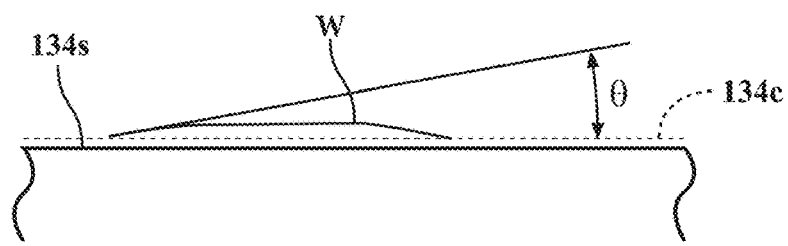
FIG. 2A illustrates a superhydrophilic surface of the porous metal GDL according to the teachings of the present disclosure.
Figure 2B:
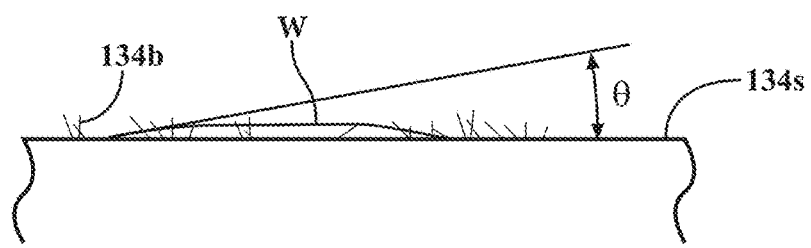
FIG. 2B illustrates another superhydrophilic surface of the porous metal GDL according to the teachings of the present disclosure.
Figure 2C:
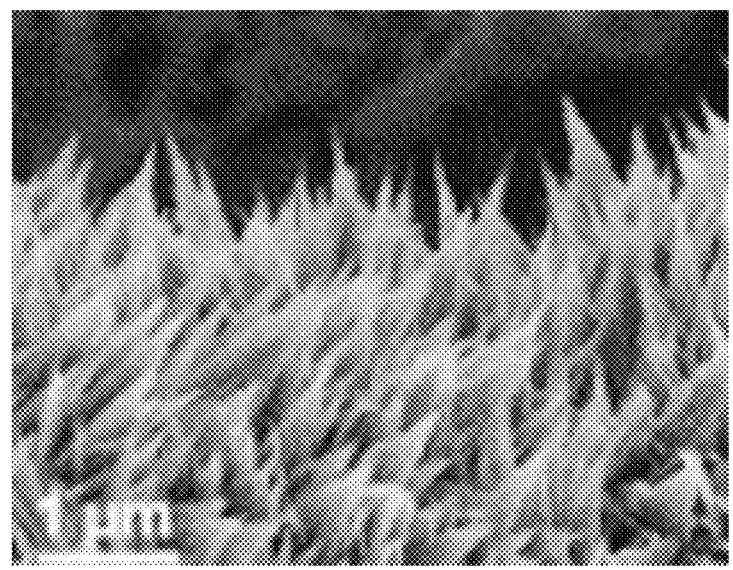
FIG. 2C shows a scanning electron microscopy image of superhydrophilic blade-shaped metal oxide nanostructures for a porous metal GDL according to the teachings of the present disclosure.

Referring to FIGS. 2A-2C, in some variations, at least a portion of the porous metal GDL 134 includes surfaces 134s that are superhydrophilic, i.e., the surfaces 134s are superhydrophilic surfaces 134s. As used herein, the term "superhydrophilic" or the phrase "superhydrophilic surfaces" refers to surfaces that exhibit a water (W) contact angle 'θ' less than or equal to 20°, e.g., between about 10° and about 20°. For example, in some variations superhydrophilic surfaces disclosed herein exhibit a water contact angle θ less than or equal to 15°, e.g., between about 5° and about 15°, and in at least one variation variations superhydrophilic surfaces disclosed herein exhibit a water contact angle θ less than or equal to 10°, e.g., between about 1° and about 10°.

In some variations, the superhydrophilic surfaces 134s have a coating 134c (FIG. 2A) that is superhydrophilic. Non-limiting examples of such superhydrophilic coatings include titanium oxide ($TiO_2$) coatings, silica ($SiO_2$) coatings, and tungsten trioxide ($WO_3$) coatings, among others. In the alternative, or in addition to, the surfaces 134s can have blade-shaped metal oxide nanostructures 134b (FIG. 2B) that are superhydrophilic, i.e., the surface 134s with the blade-shaped metal oxide nanostructures 134b is superhydrophilic. For example, a scanning electron microscopy (SEM) image of blade-shaped copper oxide nanostructures grown on a copper surface are shown in FIG. 2C and such blade-shaped copper oxide nanostructures provide a superhydrophilic surface. And as shown in FIG. 2C, in some variations the blade-shaped metal oxide nanostructures 134b have a length dimension less than or equal to about 1 micrometer (μm).

During operation of the PEM fuel cell 10, hydrogen ($H_2$) gas is provided to and flows through the flow channels 113 of the conventional bipolar plate 112 and oxygen ($O_2$) gas (e.g., $O_2$ in air) is provided to and flows through the flow channels 135 of porous metal GDL 134. A portion of the $H_2$ gas flows through the conventional GDL 114 to the anode and is catalyzed into $H^+$ ions plus electrons (e.g., via the anode catalyst layer) and a portion of the $O_2$ gas flows through the porous metal GDL 134 to the cathode. The electrons flow through an external electrical circuit (not shown) to the cathode and react with the $O_2$ to form $O^{2-}$ ions (e.g., via the cathode catalyst layer) and the $H^+$ ions diffuse through the polymer-electrolyte membrane 102 to the cathode 103 and react with the $O^{2-}$ ions to form $H_2O$ (water). The water is transported out of the PEM fuel cell 10 with the flow of unreacted $O_2$ and the porous metal GDL 134 with the planar section 134p and the flow channel section 134f provides enhanced removal of the water and increased power density compared to conventional GDLs. And in variations where the porous metal GDL 134 includes superhydrophilic surfaces 134s with the blade-shaped metal oxide nanostructures 134b, capillary forces on the water serve as a passive pump to drive or remove water from the PEM fuel cell 10.

Figure 3:
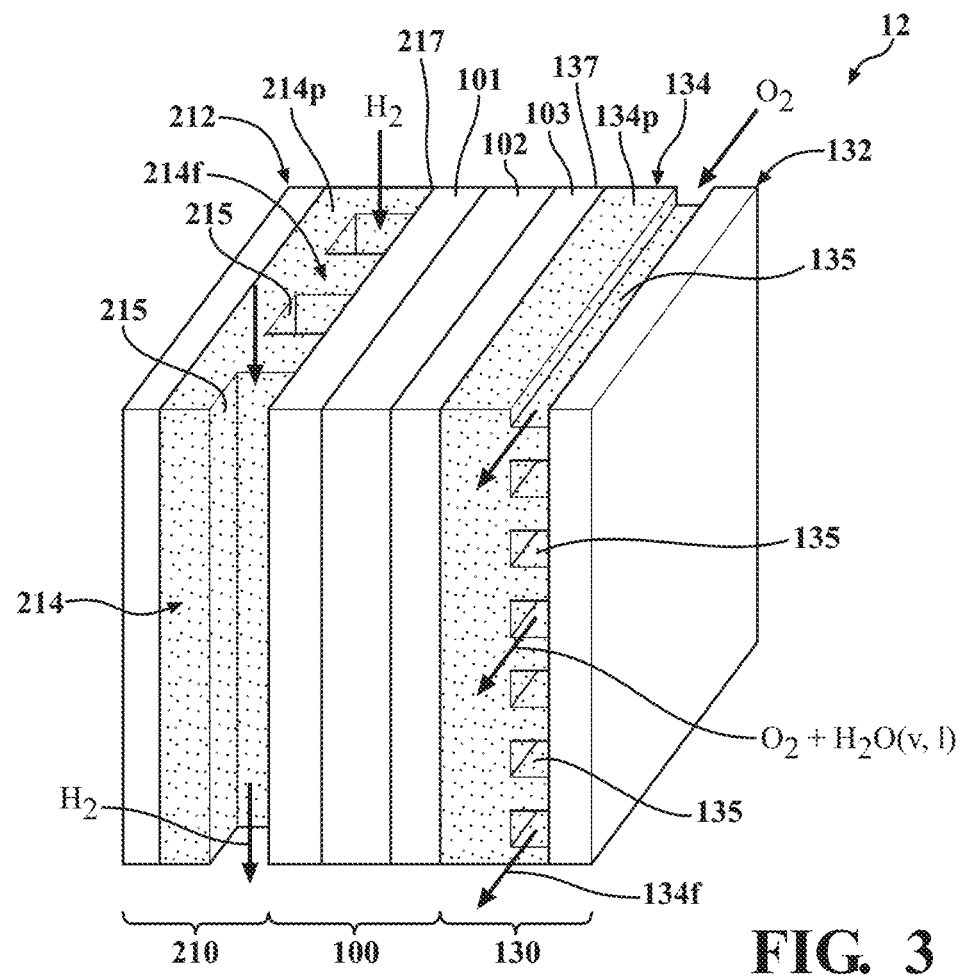
FIG. 3 illustrates a PEM fuel cell with two porous metal GDLs according to another form of the present disclosure.

Referring to FIG. 3, a PEM fuel cell 12 with a pair of porous metal GDLs according to another form of the present disclosure are shown. In some variations, the PEM fuel cell 12 includes the MEA 100 and the cathode side fluid flow system 130 as described above, and an anode side fluid flow system 210. The anode side fluid flow system 210 includes a flat bipolar plate 212 and a porous metal GDL 214 with a planar section 214p, a flow channel section 214f, and flow channels 215 within the flow channel section 214f. In some variations, the anode side fluid flow system 210 includes a microporous layer 217 between the anode 101 and the porous metal GDL 214. And in at least one variation, the flow channels 215 are hollow flow channels, i.e., the flow channels 215 are not filled or occupied by a filler material and/or an adhesive. In addition, in some variations the flow channels 215 are spaced apart from the flat bipolar plate 212 and are positioned proximal to the anode 101 as illustrated in FIG. 3.

During operation of the PEM fuel cell 12, hydrogen ($H_2$) gas is provided to and flows through the flow channels 215 of the porous metal GDL 214 and oxygen ($O_2$) gas (e.g., $O_2$ in air) is provided to and flows through the flow channels 135 of porous metal GDL 134. A portion of the $H_2$ gas flowing through the flow channels is catalyzed into $H^+$ ions plus electrons (e.g., via the anode catalyst layer) and a portion of the $O_2$ gas flows through the porous metal GDL 134 to the cathode 103. The electrons flow through an external electrical circuit (not shown) to the cathode and react with the $O_2$ to form $O^{2-}$ ions (e.g., via the cathode catalyst layer) and the $H^+$ ions diffuse through the polymer-electrolyte membrane 102 to the cathode 103 and react with the $O^{2-}$ ions to form $H_2O$ (water). The water is transported out of the PEM fuel cell 10 with the flow of unreacted $O_2$ and the porous metal GDL 134 with the planar section 134p and the flow channel section 134f provides enhanced removal of the water and increased power density compared to conventional GDLs. And in variations where the porous metal GDL 134 includes superhydrophilic surfaces 134s with the blade-shaped metal oxide nanostructures 134b, capillary forces on the water serve as a passive pump to drive or remove water from the PEM fuel cell 10.

Figure 4:
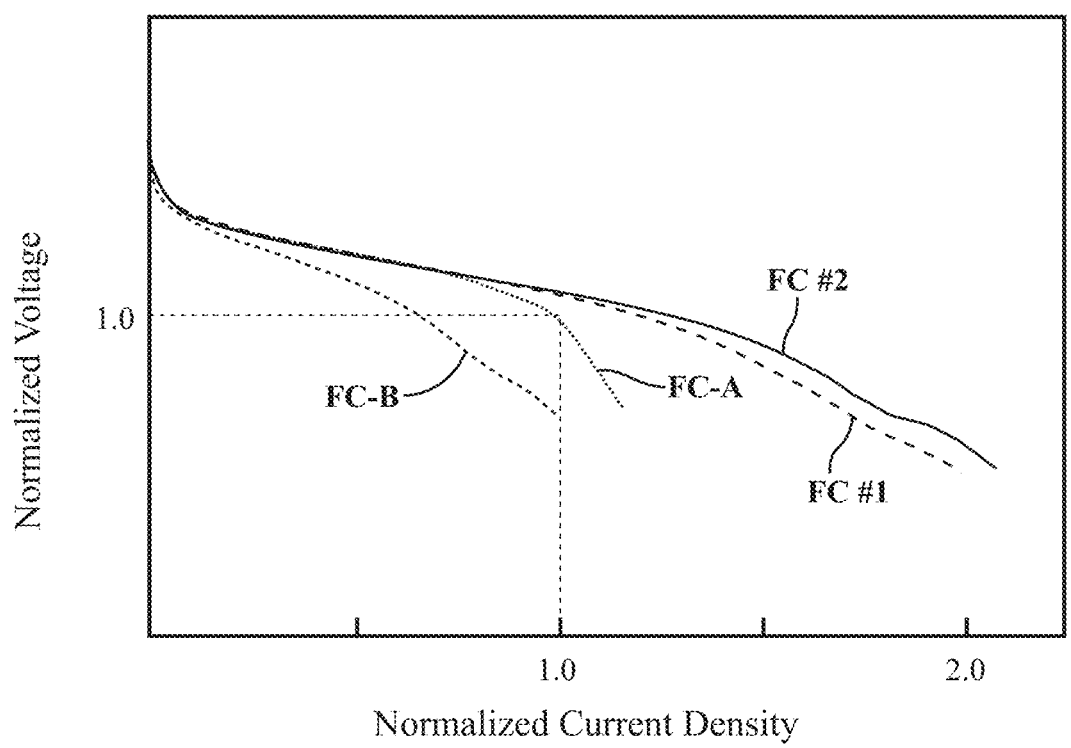
FIG. 4 is a plot of normalized voltage versus normalized current density for a PEM fuel cell with a porous metal GDL according to the teachings of the present disclosure.
Figure 5:
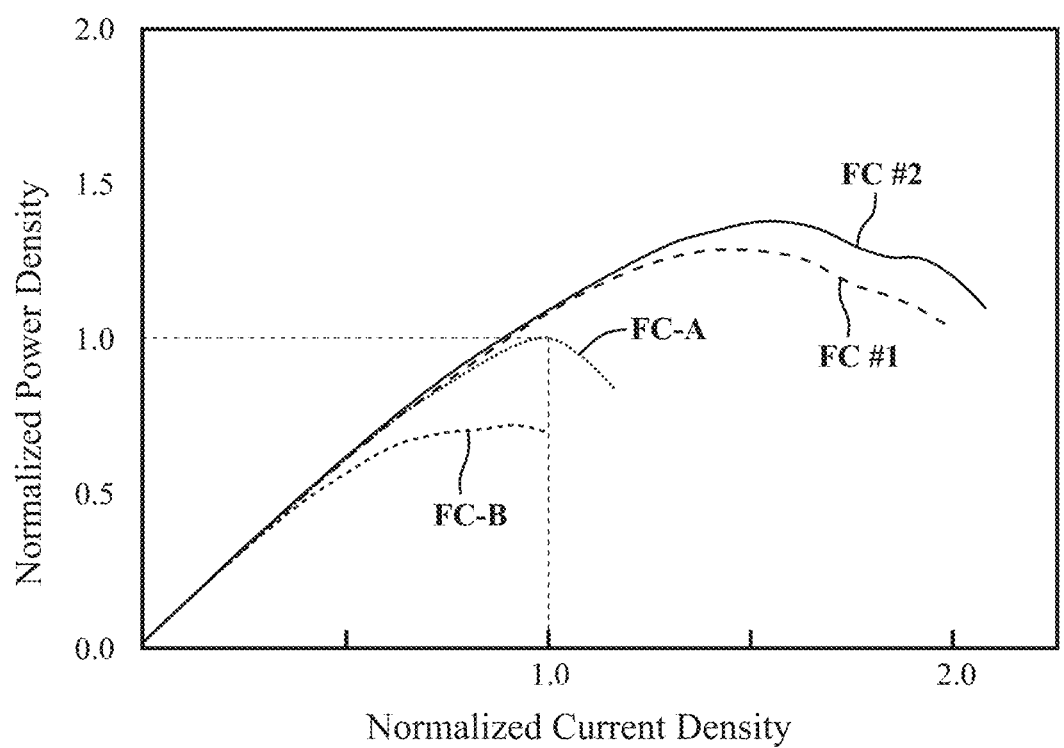
FIG. 5 is a plot of normalized power density versus normalized current density for a PEM fuel cell with a porous metal GDL according to the teachings of the present disclosure.

Referring to FIGS. 4 and 5, a plot of normalized voltage versus normalized current density is shown in FIG. 4 and a plot of normalized power density versus normalized current density is shown in FIG. 5. Referring particularly to FIG. 5, plots for power densities versus current densities for the following PEM fuel cells are shown: a conventional PEM fuel cell with a convention (carbon) GDL (labeled as "FC-A" in FIG. 4); a PEM fuel cell with a flat cathode side bipolar plate and a cathode side porous metal GDL without flow channels (labeled as "FC-B"); a PEM fuel cell with a flat cathode side bipolar plate with a porous metal GDL having flow channels with a first configuration (labeled as "FC #1"); and a PEM fuel cell with a cathode side flat bipolar plate having flow channels with a second configuration than the first configuration (labeled as "FC #2") are shown. The maximum power density and maximum current density for the FC-A fuel cell is defined as unity (1.0) in FIG. 5 and the maximum power densities and current densities of the remaining or other PEM fuel cells. And as shown in FIG. 5, the FC-B fuel cell exhibited a maximum power density of about 0.75 at a current density of about 0.8, the FC #1 fuel cell exhibited a maximum power density of about 1.3 at a current density of about 1.4, and the FC #2 fuel cell exhibited a maximum power density of about 1.6 at a current density between about 1.4 and about 1.5. Accordingly, it should be understood that PEM fuel cells with porous metal GDLs according to the teachings of the present disclosure provide power densities between or least 1.3 to 1.4 times the power density of known PEM fuel cells.

Referring now to FIGS. 6A-6D, steps for methods of forming or manufacturing the porous metal GDL 134 are shown. And while FIGS. 6A-6D are illustrated for the forming of manufacturing of the porous metal GDL 134, it should be understood that the same and/or similar steps can be used for the forming or manufacturing of the porous metal GDL 214.

Figure 6A:
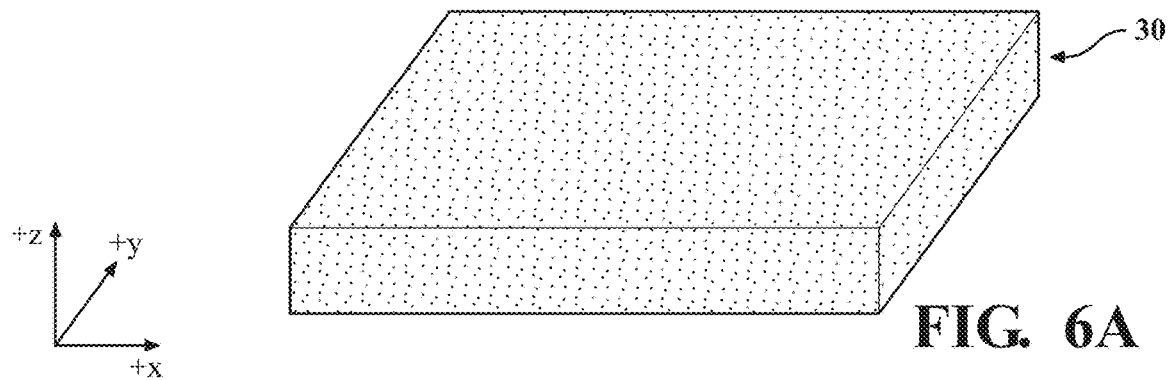
FIG. 6A illustrates a porous metal layer used to form a porous metal GDL according to the teachings of the present disclosure.
Figure 6B:
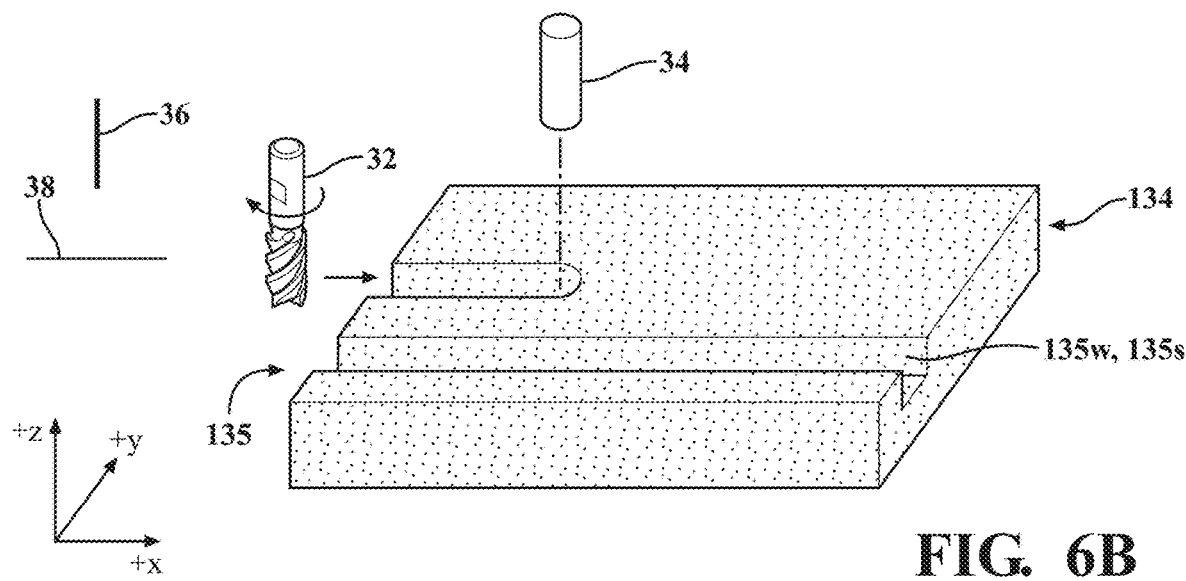
FIG. 6B illustrates at least one step of forming flow channels in the porous metal layer in FIG. 6A.
Figure 6C:
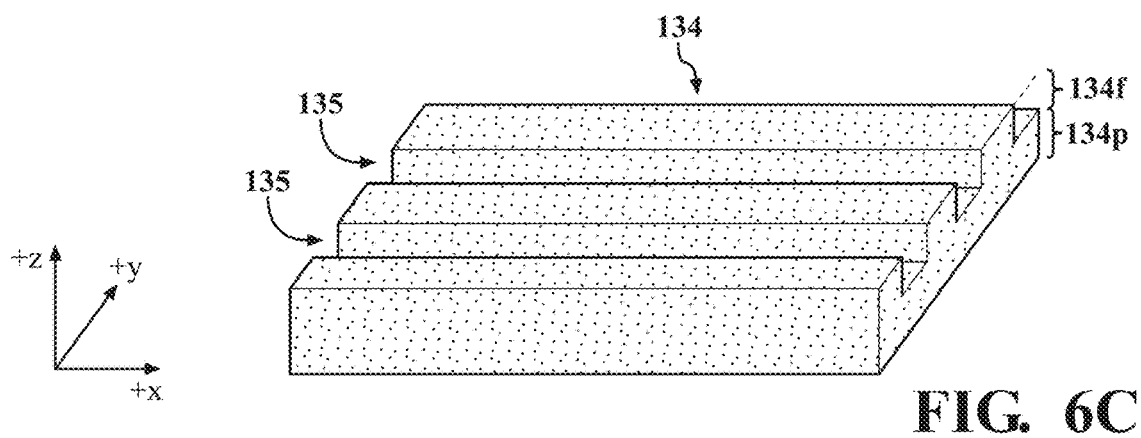
FIG. 6C illustrates a porous metal GDL formed from the porous metal layer in FIG. 6A according to the teachings of the present disclosure.
Figure 6D:
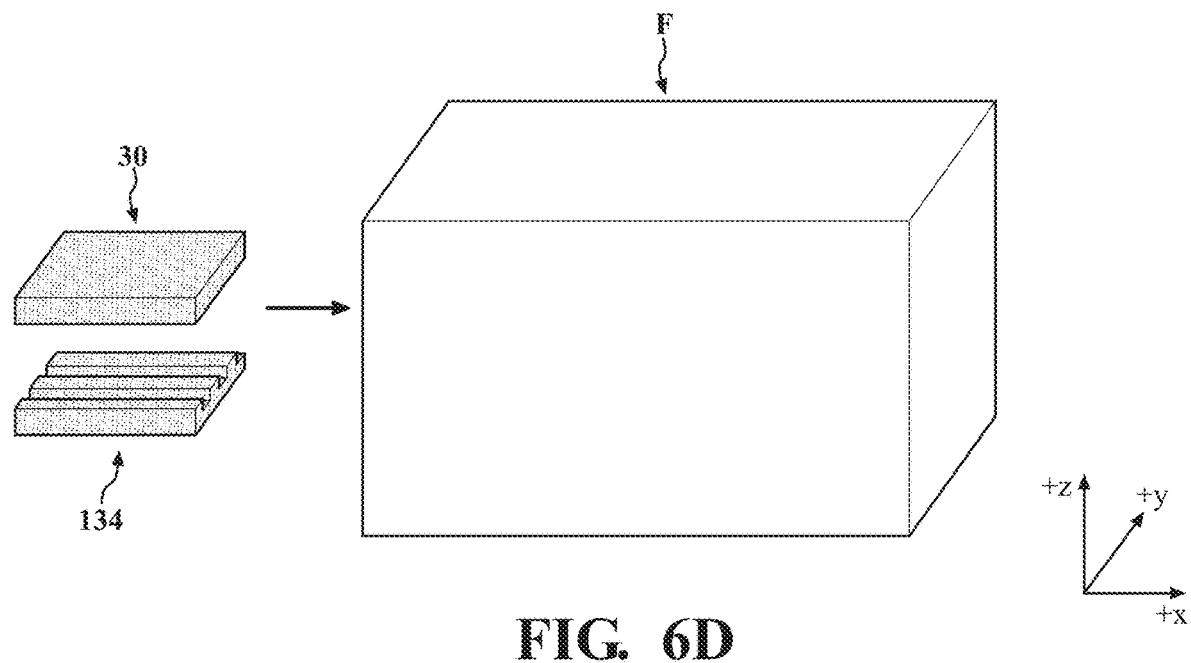
FIG. 6D illustrates placing a porous metal layer and/or a porous metal GDL in a furnace according to the teachings of the present disclosure.

FIG. 6A illustrates a porous metal layer 30 having a predefined average porosity and/or a predefined average pore size is either purchased or formed using known porous metal (foam) manufacturing techniques. In FIG. 6B, flow channels 135 defined by flow channel walls 135w and flow channels surfaces 135s are formed in the porous metal layer 30 such that the porous metal GDL 134 with the planar section 134p and flow channel section 134f is provided as shown in FIG. 6C. And in some variations, the porous metal layer 30 and/or the porous metal GDL 134 are/is are heated in a furnace 'F' (FIG. 6D) with an oxidizing atmosphere such that blade-shaped metal oxide nanostructures 134b are formed on the surfaces 134s on and within the porous metal layer 30 and/or the porous metal GDL 134. And as discussed above, the blade-shaped metal oxide nanostructures enhance the flow of water within the porous metal GDL 134.

Example methods or techniques for forming the flow channels 135 include CNC machining using a mechanical machining tool 32, laser machining using a laser 34, electrical discharge machining (EDM) using an EDM tool electrode 36, EDM machining using an EDM wire electrode 38, among others.

In some variations the average porosity of the porous metal layer 30 and the porous metal GDL 134 is between 50% and 90%, for example, between 65% and 85%, or between 70% and 80%. In at least one variation, the porous metal layer 30 and the porous metal GDL 134 have an average pore size between about 10 micrometers (μm) and about 100 μm, for example, between about 20 μm and about 75 μm, or between about 30 μm and about 50 μm. And in some variations, the surfaces of the porous metal GDL 134, i.e., the surfaces of the flow channels walls and the surfaces of the pores of the porous metal GDL 134 are hydrophilic. For example, in at least one variation, a contact angle between water droplets and the surfaces of the of the flow channels walls and the surfaces of the pores of the porous metal GDL 134 and or the porous metal GDL 214 are less than about 90°, e.g., between about 60° and about 90°.

In some variations, a total thickness (z-direction in FIG. 6C) of the porous metal GDL is between about 50 μm and 600 μm. And at least one variation, the flow channels 135 have a width (y-direction in FIG. 6C) between about 0.3 mm and about 1.5 mm. In some variations, the flow channels 135 have a depth (z-direction in FIG. 6C) between about 20 μm and about 300 μm.

Non-limiting examples of materials from which the porous metal layer 30 and the porous metal GDL 134 are formed include titanium, titanium alloy, iron, steel, stainless steel, nickel, a nickel alloy, aluminum, an aluminum alloy, copper, and a copper alloy.

Figure 7:
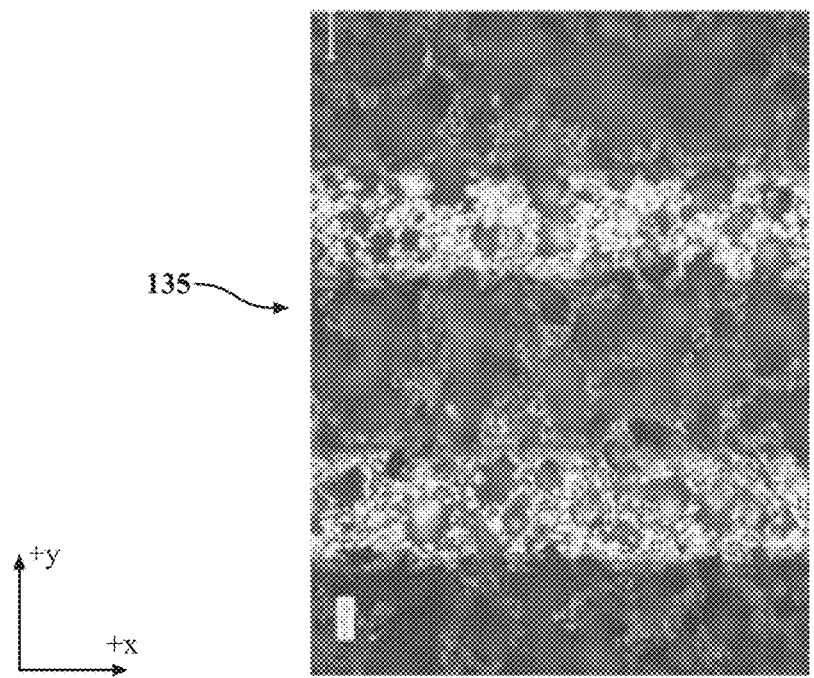
FIG. 7 is an optical microscopy image of a flow channel, flow channel walls, and flow channel surfaces of a porous metal GDL according to the teachings of the present disclosure.

Referring to FIG. 7, an optical microscope image of a flow channel 135 defined by flow channels walls and flow channel surfaces is shown. And as observed in FIG. 7, the porosity and/or pore size has been maintained during forming of the flow channels.

The preceding description is merely illustrative in nature and is in no way intended to limit the disclosure, its application, or uses. As used herein, the phrase at least one of A, B, and C should be construed to mean a logical (A or B or C), using a non-exclusive logical "or." It should be understood that the various steps within a method may be executed in different order without altering the principles of the present disclosure. Disclosure of ranges includes disclosure of all ranges and subdivided ranges within the entire range.

The headings (such as "Background" and "Summary") and sub-headings used herein are intended only for general organization of topics within the present disclosure and are not intended to limit the disclosure of the technology or any aspect thereof. The recitation of multiple forms or variations having stated features is not intended to exclude other forms or variations having additional features, or other forms or variations incorporating different combinations of the stated features.

As used herein the term "about" when related to numerical values herein refers to known commercial and/or experimental measurement variations or tolerances for the referenced quantity. In some variations, such known commercial and/or experimental measurement tolerances are +/−10% of the measured value, while in other variations such known commercial and/or experimental measurement tolerances are +/−5% of the measured value, while in still other variations such known commercial and/or experimental measurement tolerances are +/−2.5% of the measured value. And in at least one variation, such known commercial and/or experimental measurement tolerances are +/−1% of the measured value.

As used herein, the terms "comprise" and "include" and their variants are intended to be non-limiting, such that recitation of items in succession or a list is not to the exclusion of other like items that may also be useful in the devices and methods of this technology. Similarly, the terms "can" and "may" and their variants are intended to be non-limiting, such that recitation that a form or variation can or may comprise certain elements or features does not exclude other forms or variations of the present technology that do not contain those elements or features.

The broad teachings of the present disclosure can be implemented in a variety of forms. Therefore, while this disclosure includes particular examples, the true scope of the disclosure should not be so limited since other modifications will become apparent to the skilled practitioner upon a study of the specification and the following claims. Reference herein to one aspect, or various aspects means that a particular feature, structure, or characteristic described in connection with a form or variation is included in at least one form or variation. The appearances of the phrase "in one variation" or "in one form" (or variations thereof) are not necessarily referring to the same form or variation. It should also be understood that the various method steps discussed herein do not have to be carried out in the same order as depicted, and not each method step is required in each form or variation.

The foregoing description of the forms or variations has been provided for purposes of illustration and description. It is not intended to be exhaustive or to limit the disclosure. Individual elements or features of a particular form or variation are generally not limited to that particular form or variation, but, where applicable, are interchangeable and can be used in a selected form or variation, even if not specifically shown or described. The same may also be varied in many ways. Such variations should not be regarded as a departure from the disclosure, and all such modifications are intended to be included within the scope of the disclosure.

While particular forms or variations have been described, alternatives, modifications, variations, improvements, and substantial equivalents that are or may be presently unforeseen may arise to applicants or others skilled in the art. Accordingly, the appended claims as filed and as they may be amended, are intended to embrace all such alternatives, modifications variations, improvements, and substantial equivalents.

What is claimed is:

1. A bipolar plate-gas diffusion layer (GDL) assembly for a polymer-electrolyte-membrane fuel cell, the bipolar plate—GDL assembly comprising:
    a flat metallic bipolar plate; and
    a porous metal foam GDL adjacent to and in direct contact with the flat metallic bipolar plate, the porous metal foam GDL comprising:
    a flow channel section and a planar section, the flow channel section and the planar section having surfaces comprising at least one of a superhydrophilic coating and thermally formed superhydrophilic blade-shape metal oxide nanostructures, the flow channel section comprising flow channels defined by flow channel walls and flow channel surfaces with an average porosity generally equal to an average porosity of an interior of the porous metal foam GDL.

2. The bipolar plate—GDL assembly according to claim 1, wherein the flow channels are hollow flow channels.

3. The bipolar plate—GDL assembly according to claim 1, wherein the surfaces comprise the thermally formed superhydrophilic blade-shaped metal oxide nanostructures.

4. The bipolar plate—GDL assembly according to claim 3, wherein the superhydrophilic surfaces comprise blade-shaped metal oxide nanostructures have a length dimension less than about 1.0 µm.

5. The bipolar plate—GDL assembly according to claim 1, wherein a water contact angle between water droplets and the flow channel surfaces of the flow channel walls is less than or equal to 20°.

6. The bipolar plate—GDL assembly according to claim 5, wherein the water contact angle is less than or equal to 10°.

7. The bipolar plate—GDL assembly according to claim 1, wherein the porous metal foam GDL is formed from at least one of titanium, titanium alloy, iron, steel, stainless steel, nickel, a nickel alloy, aluminum, an aluminum alloy, copper, and a copper alloy.

8. The bipolar plate—GDL assembly according to claim 1, wherein the average porosity of the porous metal foam GDL is between about 65% and 85%.

9. The bipolar plate—GDL assembly according to claim 1, wherein the porous metal foam GDL is formed from copper or a copper alloy.

10. The bipolar plate—GDL assembly according to claim 9, wherein the surfaces of the porous metal foam GDL thermally formed superhydrophilic blade-shape copper oxide nanostructures.

11. The bipolar plate—GDL assembly according to claim 10, wherein the thermally formed superhydrophilic blade-shape copper oxide nanostructures have a length dimension less than about 1.0 µm.

12. The bipolar plate—GDL assembly according to claim 1, wherein the porous metal foam GDL has a thickness between about 50 µm and 600 µm.

13. The bipolar plate—GDL assembly according to claim 12, wherein the flow channels have a width between about 0.3 mm and about 1.5 mm.

14. The bipolar plate—GDL assembly according to claim 13, wherein the flow channels have a depth between about 20 µm and about 300 µm.

15. A polymer-electrolyte-membrane fuel cell comprising:
    an anode;
    a membrane electrode assembly comprising a membrane, an anode catalyst layer, and a cathode catalyst layer;
    a porous metal foam gas diffusion layer (GDL) comprising superhydrophilic surfaces with a superhydrophilic coating, thermally formed superhydrophilic blade-shape metal oxide nanostructures, or a combination thereof, an average porosity, and flow channels defined by flow channel walls and flow channel surfaces; and
    a flat bipolar plate adjacent to and in direct contact with the porous metal foam GDL, the flow channel walls and the flow channel surfaces having an average porosity generally equal to the average porosity of the porous metal foam GDL.

16. The polymer-electrolyte-membrane fuel cell according to claim 15, wherein the flow channels are hollow flow channels.

17. The polymer-electrolyte-membrane fuel cell according to claim 15, wherein the superhydrophilic surfaces have the blade-shaped metal oxide nanostructures.

18. The polymer-electrolyte-membrane fuel cell according to claim 17, wherein the superhydrophilic surfaces comprise blade-shaped metal oxide nanostructures have a length dimension less than about 1.0 µm.

19. The polymer-electrolyte-membrane fuel cell according to claim 15, wherein a contact angle between water droplets and the flow channel surfaces of the flow channel walls is less than or equal to 20°.

20. The polymer-electrolyte-membrane fuel cell according to claim 15, wherein the porous metal foam GDL has at least one of:
    a thickness between about 50 µm and 600 µm;
    a width between about 0.3 mm and about 1.5 mm; and
    a depth between about 20 µm and about 300 µm.

* * * * *